(12) United States Patent
Taylor et al.

(10) Patent No.: US 6,564,922 B1
(45) Date of Patent: May 20, 2003

(54) FLEX DIVERTER

(75) Inventors: Matthew G. Taylor, Longwood, FL (US); Richard V. Rigling, Orlando, FL (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/814,272

(22) Filed: Mar. 21, 2001

(51) Int. Cl.[7] ................................................ B65G 47/10
(52) U.S. Cl. ............................ 198/370.01; 198/370.03; 198/367; 198/360; 207/655
(58) Field of Search ..................... 209/655; 198/370.01, 198/370.03, 370.04, 367, 369.7, 360

(56) References Cited

U.S. PATENT DOCUMENTS

| | | | |
|---|---|---|---|
| 1,325,602 A | * | 12/1919 | Albright |
| 2,868,245 A | * | 1/1959 | Ernst |
| 3,319,768 A | * | 5/1967 | Holzhauer |
| 3,615,152 A | | 10/1971 | Bouzat et al. |
| 4,410,082 A | | 10/1983 | McGinnes |
| 4,720,005 A | | 1/1988 | Beresinsky |
| 4,804,078 A | | 2/1989 | Scata' |
| 5,111,926 A | | 5/1992 | Long |
| 5,407,083 A | | 4/1995 | Bertleff |
| 5,641,052 A | * | 6/1997 | Lazzarotti et al. .......... 198/360 |
| 5,655,643 A | * | 8/1997 | Bonnet ................... 198/370.08 |
| 5,887,698 A | * | 3/1999 | Soldavini .................. 193/31 A |
| 6,095,314 A | * | 8/2000 | Fortenbery ................. 198/360 |
| 6,168,006 B1 | * | 1/2001 | Bytow ........................ 198/360 |

* cited by examiner

Primary Examiner—James R. Bidwell
Assistant Examiner—Richard Ridley
(74) Attorney, Agent, or Firm—Perkins, Smith & Cohen, LLP; Harvey Kaye; Jacob N. Erlich

(57) ABSTRACT

A sorting and conveying system has a longitudinally extending conveyor having at least one tilt tray, but preferably a plurality, on the conveyor for diverting selected articles from the conveyor. There is at least one hanger for holding a plurality of bags. A chute extends between the tilt tray and the hanger.

A flexible sheet diverter has an entrance near the top adjacent the chute and an exit near the bottom adjacent the bags, so that articles diverted from the conveyor will be delivered to the exit. Cylinders are provided for moving the sheet diverter so that the exit is positioned to deliver a selected article into a selected bag on the hanger. There are a plurality of tilt trays along the conveyor and a plurality of hangers so that a selected article on the conveyor may be delivered from a selected tilt tray to a selected bag. Mounts are provided for mounting the flexible sheet diverter for shaped movement, and there are air cylinders for moving the flexible sheet diverter.

11 Claims, 2 Drawing Sheets

Diverting to Side Location

FLEX DIVERTER

FIELD OF THE INVENTION

This invention relates generally to an article sorting system and, more particularly, to sorting articles, such as mail, into different bags or sacks at high throughput and high density.

BACKGROUND OF THE INVENTION

In the past, rigid flappers were used in a rigid chute or pop-up belt transfer arrangement to divert articles off of a motorized roller conveyor, but there were several shortcomings of such systems including insufficient speed and sorting density.

U.S. Pat. No. 3,615,152 discloses a conveyor conveyor belts including a flat end less conveyor belt which can be deformed or moved so that the center section is flat and the outer sections are elevated.

U.S. Pat. No. 4,410,082 discloses a stretchable load-retaining conveyor belt which can have its edges deformed upwardly and form a load retaining wall.

U.S. Pat. No. 4,720,005 discloses a material conveyor and distribution system having a conveyor belt system in a V-shape and where one or more of the belts are deformed at preselected locations to allow gravity to drop material on the belt.

U.S. Pat. No. 4,804,078 discloses a sorting device for conveyor belt systems which has conveyor belts that deliver articles to a pivoted flat element and which is moved by a cylinder.

U.S. Pat. 5,111,926 discloses a singulating and orienting slide conveyor in which the conveyor is twisted over its length to form a U-shaped bottom which delivers articles from the bottom.

U.S. Pat. No. 5,407,083 discloses an apparatus for sorting and guiding workpieces in which a rotatable frame moves and webs thereon may be tensioned to form an inclined plane for the workpieces to be delivered.

SUMMARY OF THE INVENTION

It is an object of the present invention to provide high throughput and high density diversion of bagged products into different sacks.

It is another object of the present invention to provide a method and apparatus to increase the efficiency of a mail sorting system.

It is a further object of the present invention to provide the higher sorting density with a simple low cost mechanism and one which allows for a shorter sorter at lower cost.

Some of the advantages of the present invention are higher sorting density with simple low cost mechanism - a shorter sorter is required at lower cost.

These and other objects are accomplished according to the invention in which a rigid chute connected as an exit from a conveyor leads to an inclined flexible sheet supported at the lower corners by guided air cylinders. An array of mail sacks are supported below the sheet, typically three.

A package is diverted into any one of a number of locations, e.g., three locations, in this manner.

The present invention provides a device and a method for receiving a sequence of small packages such as polybags or cartons and sorting them into different mail sack locations as required.

Thus, when an article is to be bagged into a selected bag at a selected multibag site, the product is diverted from the conveyor onto an exit chute from which it is fed into the inclined flexible sheet supported at the lower, exit corners by air cylinders. The mail sacks are supported below the sheet. The air cylinders can be actuated to warp the flexible sheet, which may be made of plastic, such that a package is diverted into either of the side locations. If the cylinders are not actuated then the package travels straight into the default end sack. The air cylinders change the shape of the flexible sheet thereby directing the flow of packages into one of three locations. Sensors may be used to confirm delivery to the appropriate location.

The present invention together with the above and other advantages may best be understood from the following detailed description of the embodiments of the invention illustrated in the drawings, wherein:

DETAILED DESCRIPTION OF PREFERRED EMBODIMENTS

Figure 2:
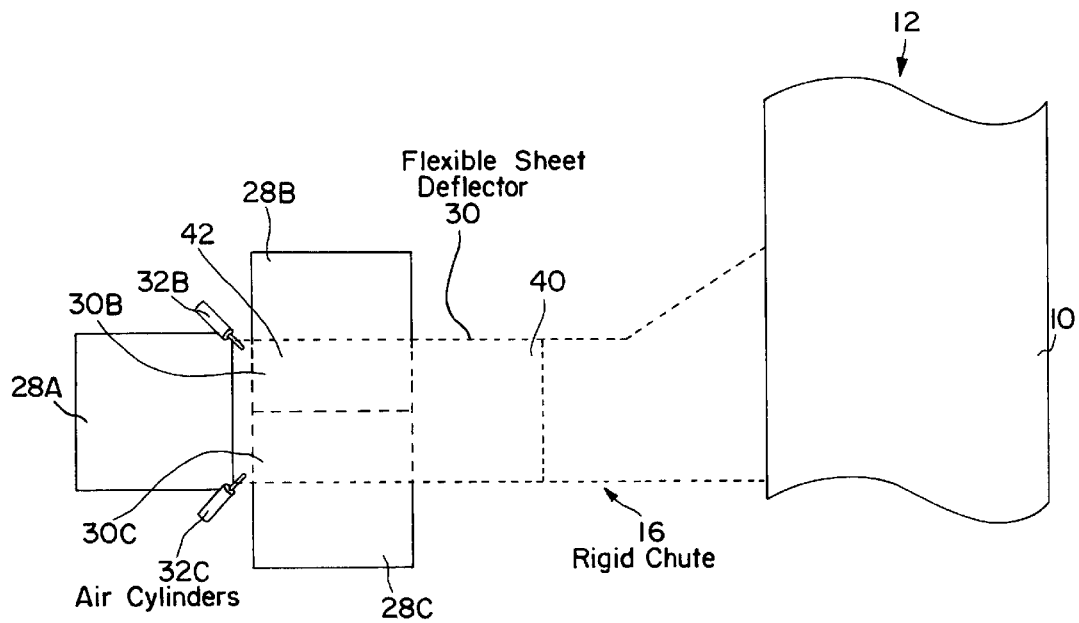
FIG. 2 is a schematic side view of a tilt tray, feed chute, flexible feed sheet and bag hanger.
Figure 1:
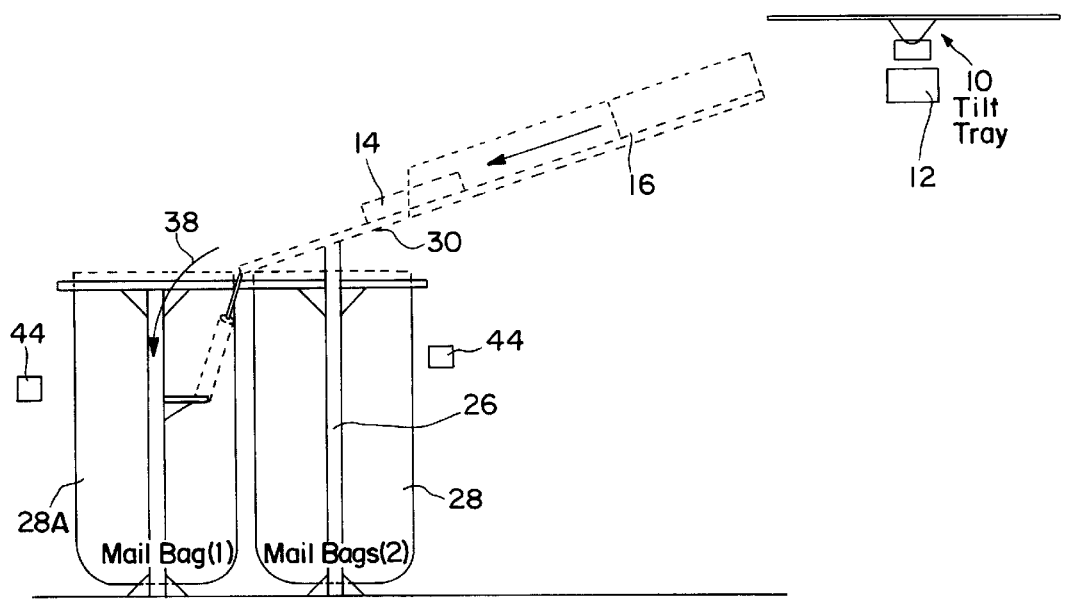
FIG. 1 is a schematic plan view of the feed chute, feed sheet and bag hanger.

In general, an apparatus and method are provided for receiving a sequence of small packages such as polybags or cartons and sorting them into different mail sack locations as required. A rigid chute leads to a flexible sheet supported at the corners by guided air cylinders. Three mail sacks are supported below the sheet. The air cylinders can be actuated to warp or change the shape of the flexible plastic sheet such that a package is diverted into either of the side location, and if the cylinders are not actuated then the package travels straight into the default end sack thereby directing the flow of packages into one of three locations. Sensors can be used to confirm delivery to the appropriate location.

The air cylinder extends and warps the flexible sheet deflector. When a package is discharged from the tilt tray and slides down the chute it follows the warped contour of the deflector into the mailbag. The packages are discharged from a tilt tray, cross-belt, or similar sorter onto a chute. The chute spacing is limited by sorter design. Currently in the art only one mail sack is positioned at the end of each chute. Sorting density is low.

A mechanism with a flexible sheet and two air cylinders is positioned at the end of the chute. Three mail bags are tightly arranged on the three free faces of the chute. The mechanism is actuated to form a path to the desired mail bag. The package is discharged onto the chute and diverted into the correct mail bag.

Thus, the present invention uses linear actuators with a single flexible sheet to direct sliding articles. A flexible sheet is deformed selectively and thereby selectively sorts articles of any shape into different destination containers or conveyors. The present invention uses a continues flexible sheet instead of individual hard slides.

The present invention selectively sorts individual or bulk product that is sliding under its own weight on a continuous sheet. The sheet is deformed to direct articles to a desired location using air cylinders, not rollers or fixed slides. Selectively sorts individual or bulk product that is sliding under its own weight on a continuous sheet. The sheet is static, not moving like a belt and is used to selectively sort articles not convey them to a single location.

The deformable sheet directs single or bulk articles as they slide across the sheet. More in detail, the present invention provides a conveyor 12 which carries a plurality of tilt trays or carts 10 which are moved by the conveyor 12 and follow the conveyor path. When an article 14 on the tray 10 is to be deposited at a selected location, the tray 10 tilts in the direction the article 14 is to be fed and the article 14 moves off of the tilt tray 10 and into a sorting device. The use of tilt tray or carts is known in this art, U.S. Pat. No. 6,112,879 being a recent example of one such device as used for a package sorting conveyor.

In the present invention there may be a plurality of locations at which the tilt trays deposit articles. After being deposited at a selected location, the article 14 slides down a chute 16 located at each deposit location and onto an inclined flexible or deformable sheet deflector 30.

Below the sheet 30 there is an arrangement of bags 28, such as three, mounted on a hanger 26 and the sheet deflector 30 is controlled in its movement so that a corner 30B or 30C is positioned to shape the sheet so as to move the article into the chosen bag 28 and the article 14 falls, by gravity, off the lower end or exit 42 of sheet 30 and into the selected bag 28.

The movement of the sheet 30 to divert a selected article 14 into a selected bag 28 is timed so that the sheet is in its correct position for the delivery to the selected bag before the article has passed completely down the length of the sheet 30 from its entrance 40 at its upper end. Sensors 44 may be used to confirm delivery of the articles.

The present invention thus provides a device and a method for receiving a sequence of small packages such as polybags or cartons and sorting them into different mail sack locations as required. The deformable sheet is moved by actuators such as air cylinders 32B and 32C which move the corners of the sheet thereby directing the flow of packages into, e.g., one of three or more location. For example, sensors 44 may be used to confirm delivery to the appropriate location.

Thus, when an article 14 is to be bagged into a selected bag 28 at a selected multi-bag site, the product is diverted from the conveyor onto an exit chute 16 from which it is fed onto the flexible sheet deflector 30

Figure 3:
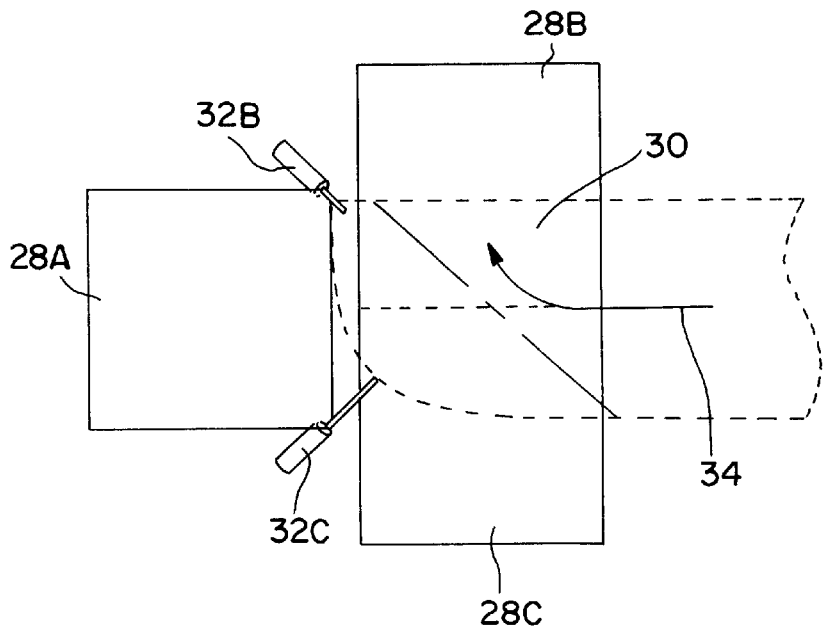
FIG. 3 is a schematic plan view of the feed sheet and feed bags.
Figure 4:
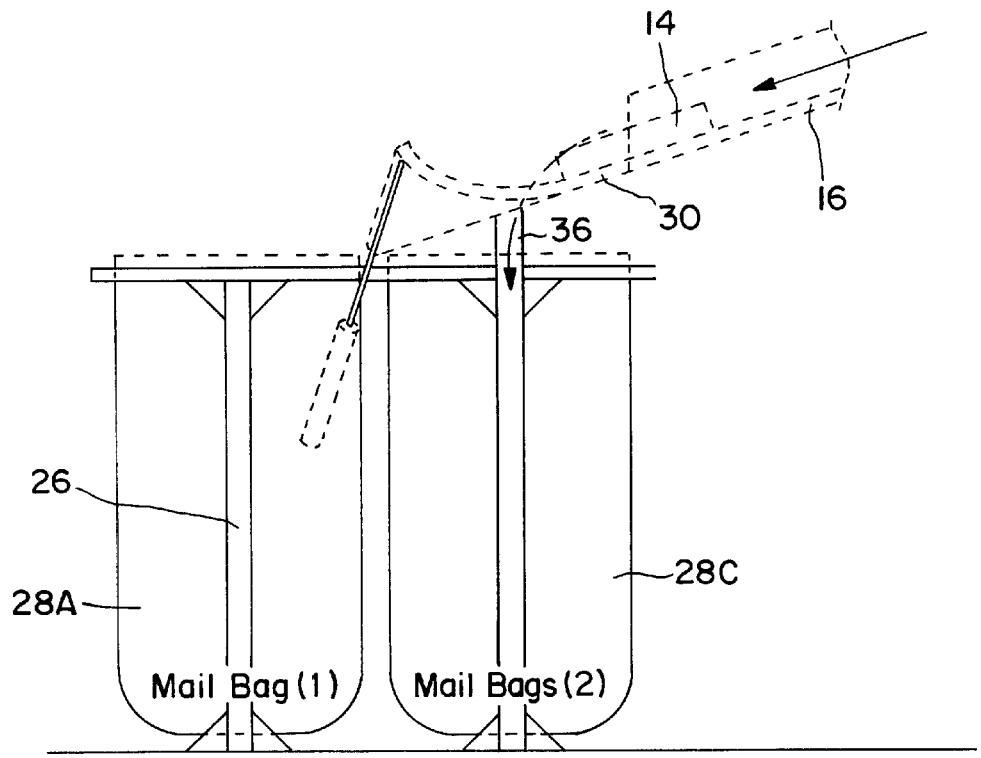
FIG. 4 is a schematic side view of the feed chute, feed sheet and bags.

In operation, articles 14 such as packages are discharged from the tilt tray 10 (although a cross-belt or similar sorter device could be used) and onto a chute 16. While on the chute the packages or articles slide downwardly towards the deformable sheet deflector 30. The hanger 26 holding three mail bags 28 which are tightly arranged below and toward the end of the sheet. The articles are diverted by the flexible sheet deflector 30 into the correct mail bag 28 by being deformed by the air cylinders to direct the articles into one or the other side bag. For example, in FIG. 3 cylinder 32C when actuated raises sheet corner 30C so that article 14 follows the path of arow 34 and is delivered into bag 28B. FIG. 4 shows cylinder 32B actuated and sheet corner 30B is raised and articles 14 are delivered to bag 28C. If the sheet is not deformed, the articles slide off the end of the sheet and are delivered to the bag which is properly positioned for this to take place. This provides up to three times the sorting density compared to prior devices and a shorter sorted may be used as a result.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. In a sorting and conveying system having a longitudinally extending conveyor, the improvement comprising:
   a. a conveyor;
   b. at least one tilt tray on the conveyor for diverting selected articles from said conveyor;
   c. at least one hanger for holding a plurality of bags;
   d. a chute extending between the tilt tray and the hanger;
   e. a deformable sheet diverter having an entrance near the top adjacent said chute and an exit near the bottom adjacent said hanger, so that articles diverted from the conveyor will be delivered to a selected bag.

2. The improvement as defined in claim 1 further comprising means for moving the deformable sheet so that the exit may be positioned to deliver a selected article into a selected bag on said hanger.

3. The improvement as defined in claim 2 wherein there are a plurality of tilt trays along the conveyor and a plurality of hangers so that a selected article on the conveyor may be delivered from a selected tilt tray to a selected bag.

4. The improvement as defined in claim 2, further comprising means for moving one of the two corners of the sheet near the exit to deform the sheet so that it assumes a form which permits it to direct articles toward one or the other corner, and a drive for moving the sheet diverter.

5. The improvement as defined in claim 4 wherein said moving means includes two air cylinders for moving the corners of said sheet.

6. The improvement as defined in claim 5 wherein said sheet is flexible.

7. The improvement as defined in claim 5 wherein said sheet is made of a plastic.

8. The improvement as defined in claim 5 wherein said sheet is inclined.

9. The improvement as defined in claim 5 wherein said chute is rigid.

10. In a sorting and conveying system having a longitudinally extending conveyor, at least one tilt tray on the conveyor for diverting selected articles from the conveyor, at least one hanger for holding a plurality of bags, and a chute extending between the tilt tray and the hanger, the improvement comprising:

a flexible sheet diverter having an entrance near the top adjacent to the chute and an exit near the bottom adjacent the hanger so that articles diverter from the conveyor are delivered to a particular bag on the hanger, said diverter having two corners at the bottom thereof;

means for selectively moving one or the other corner of the diverter to guide articles into a selected bag, whereby when no corner is moved articles are delivered into one bag on the hanger, when a first corner is moved upwardly, an article is delivered to a bag opposite said first corner, and when a second corner is moved upwardly, an article is delivered to a bag opposite said second corner.

11. The improvement as defined in claim 10 wherein said moving means include air cylinders.

* * * * *